June 4, 1968     M. L. POWELL     3,386,645
PACKAGING SHEET MATERIAL
Filed Feb. 16, 1967     2 Sheets-Sheet 1
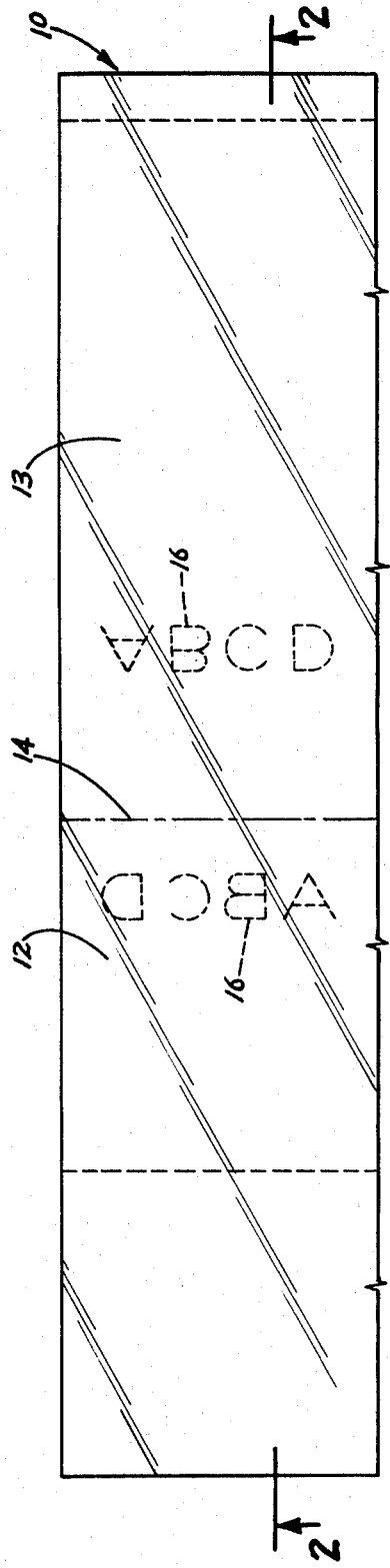
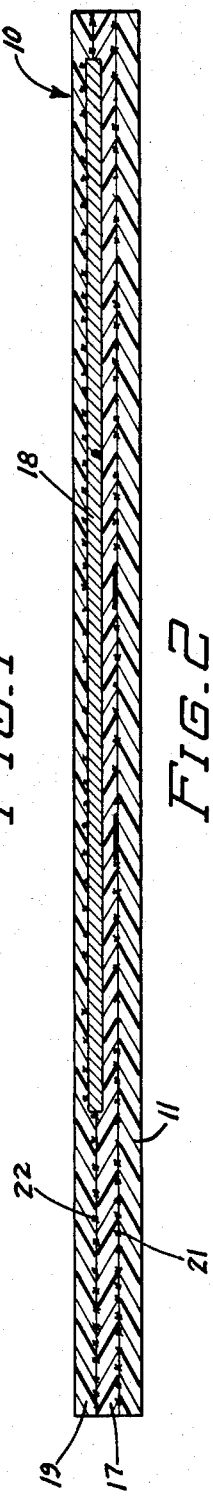
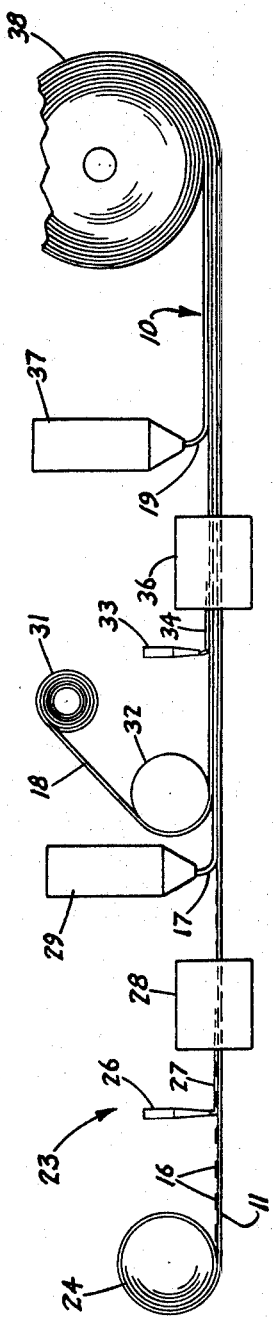
INVENTOR.
MILTON L. POWELL
BY Burd, MacEachron, Braddock, Bartz & Schwartz
ATTORNEYS June 4, 1968 M. L. POWELL 3,386,645
PACKAGING SHEET MATERIAL
Filed Feb. 16, 1967 2 Sheets-Sheet 2

INVENTOR.
MILTON L. POWELL
BY Burd, MacEachron, Braddock,
Bartz & Schwartz
ATTORNEYS

# United States Patent Office 3,386,645
Patented June 4, 1968

3,386,645
PACKAGING SHEET MATERIAL
Milton L. Powell, San Carlos, Calif., assignor to Rap Industries Incorporated, Minneapolis, Minn., a corporation of Ohio
Filed Feb. 16, 1967, Ser. No. 616,681
14 Claims. (Cl. 229—55)

ABSTRACT OF THE DISCLOSURE

A laminated sheet material for making heat sealable packages having an external web of cellophane with reverse print on one surface of the cellophane. A film of polyethylene is bonded to and covers the printed surface of the cellophane. Covering a portion of the polyethylene film is a sheet of aluminum foil with the bright surface of the foil facing the polyethylene and reverse print. A second film of polyethylene covers the aluminum foil and polyethylene film forming the inside surface of the sheet material.

The package formed of this sheet material has a flexible front wall and a flexible rear wall interconnected along a common fold line. The peripheral edges of the walls are located in face-to-face relation and are sealed together whereby the aluminum foil forms a background for the print.

Summary of invention

This invention relates to laminated sheet material usable to form a package for products and the package formed from the sheet material. The sheet material of this invention is an improvement of the packaging sheet material and package formed from the sheet material disclosed in U.S. Patent No. 3,285,497.

Briefly described, the laminated sheet material of this invention has an overall transparent thermoplastic coating in combination with an aluminum foil for reinforcing a transparent cellulose film. The aluminum foil is narrower than the cellulose film and is positioned over reverse print on the transparent cellulose film. The print may be formed from transparent ink and of a color which contrasts with the color of the aluminum foil whereby the foil provides a background to set off the print.

The package is formed by folding the laminated sheet with the inside thermoplastic surfaces in back-to-back relation. The package is completed by heat sealing the top and side portions to form a pouch for receiving the product to be packaged. The pouch is closed by heat sealing the open end. The aluminum backing eliminates the difficult and costly procedure of applying background colors over print to provide visual contrast between the print and the remainder of the package. In addition, the aluminum functions as an effective gas and vapor barrier.

In the drawings:

FIGURE 1 is a plan view of the inside facing of the laminated sheet material of this invention;

FIGURE 2 is a sectional view taken along the line 2—2 of FIGURE 1;

FIGURE 3 is a diagrammatic view of the apparatus for making the sheet material of FIGURE 1;

Figure 4:
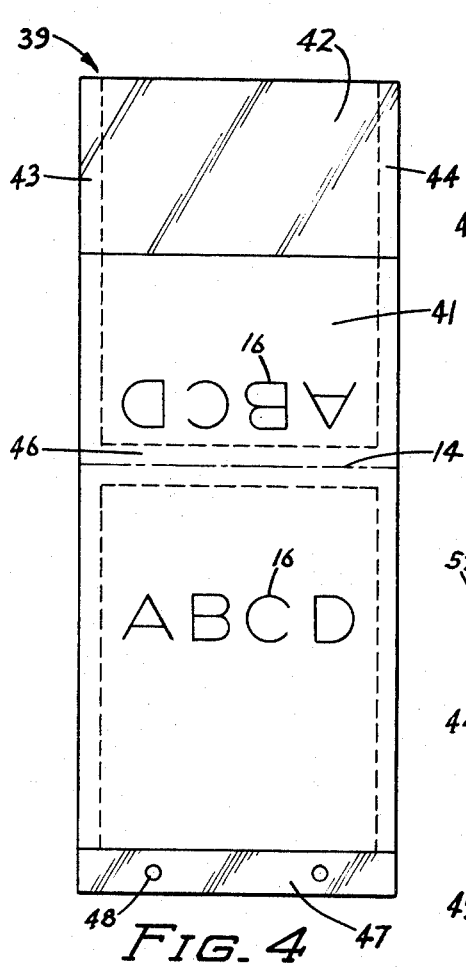
FIGURE 4 is a layout package blank of laminated sheet material indicating the peripheral areas which are sealed to form a pouch.
Figure 5:
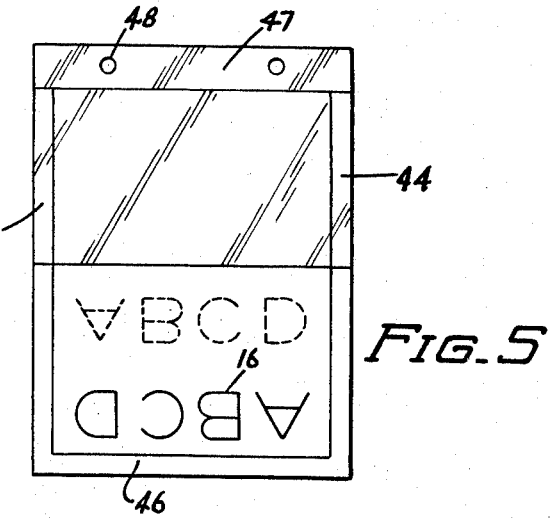
FIGURE 5 is an elevational view of a pouch formed from the blank of FIGURE 4.

Referring to the drawings, there is shown in FIGURES 1 and 2, laminated sheet or roll material indicated generally at 10 in the form of a continuous web. Material 10 comprises a base web or layer 11 of transparent plastic film characterized as being strong and stable, relatively thin, smooth and flexible, and impervious to gas and liquids including greases and oil. Preferably, base layer 11 is a film having sparkling transparency, a thickness of about .8 mil to 1.9 mils, printability and low cost. The following package films are examples of suitable films which may be used as base layer 11; cellophane or similar cellulosic film material which may be cellophane, coated or uncoated; cellulose acetate; cellulose nitrate; cellulose acetate butyrate; synthetic resinous films as nylon, polyester (Mylar), polypropylene, polystyrene, polyvinylidene chloride (Saran) and vinyl acetate, polyvinyl chloride and the like, and composite films composed of one or more of these materials.

Separate areas 12 and 13 on opposite sides of a longitudinal center line 14, as shown in FIGURE 1, are used to accommodate reverse print 16, as printed information and/or design subject matter. Print 16 may be transparent ink, opaque ink, or a combination of transparent and opaque ink, and applied to the top surface of base layer 11 in a longitudinal direction in repeat patterns according to the requirements of the ultimate package. The entire surface of base layer 11 may be printed with transparent ink or transparent ink in combination with opaque ink. The particular style and size of print as well as the color or colors are selected to advantageously describe and advertise the produce to be packaged. The printing may be done by flexographic rotogravure or other suitable methods.

The entire side of base layer 11 having reverse print 16 is coated with a thin layer of thermoplastic material 17 to form a flexible and transparent coating capable of being fused by heat into a weld type seal. The bond 21 between base layer 11 and thermoplastic material 17 is enhanced by an adhesion promoting primer which conditions the surface including the print so that an effective bond or weld is obtained. Thermoplastic material 17 is characterized as a plastic film having transparent sparkling clarity, high tear strength and heat seal properties. Preferably, material 17 may range in thickness from about 0.4 mil to 4 mils. For example, material 17 may be a film of polyethylene, polypropylene, cellulose acetate, polyvinylidene chloride or vinyl copolymer. The layers, as shown in FIGURE 2, are greatly exaggerated as to thickness. The thermoplastic material 17 may be replaced with a suitable adhesive, as polyurethane adhesive, to bond the base layer 11 to foil 18.

Areas 12 and 13 of base layer 11 are covered with a sheet of metal foil 18, as steel foil or aluminum foil. The following description uses aluminum foil having a shiny side and a dull side which may range in thickness from .27 mil to 1 mil. Aluminum foil 18 is placed over reverse print 16 with the bright or shiny side facing the reverse print whereby the aluminum foil provides a silver metallic colored surface which forms a light reflective background for the print. This surface provides a contrasting color background producing a brilliance to visually offset the printed data and/or design on base layer 11. Alternatively, the foil can be placed over the reverse print with the dull side facing the reverse print. Also, the aluminum foil may have a width to cover only part of the reverse print leaving part of the reverse print in the transparent area of the sheet material. For example, the aluminum foil may cover from 5% to 95% of the base layer and may be in separated strips extended either transversely or longitudinally of base layer 11.

A second layer of thermoplastic heat seal coating 19 similar to thermoplastic material 17, covers the entire top surface of the aluminum foil 18 and base layer 11. For example, coating 19 may be a film of polyethylene, polypropylene, cellulose acetate, polyvinylidene chloride or vinyl copolymer. The bond 22 between foil 18 and material 19 is enhanced by a primer, such as a shellac wash coat. The thermoplastic coating 19 in addition to covering the aluminum foil functions as a bonding or laminating material in the formation of the pouch and package.

The following example is a specific illustration of the sheet material of this invention.

Base layer 11 is a cellophane identified as "195 MSBO–10" having one side coated with nitrocellulose. The uncoated side is printed with reverse print 16 by flexographic methods with a plurality of colors including transparent ink. A layer or coating of polyethylene 17 is used to laminate 35 gauge aluminum foil 18 with the shiny side of the aluminum foil facing the reverse print to base layer 11. The aluminum foil covers about three-fourths of the width of the cellophane and is aligned with the print to provide a background for the print. A second layer 19 of polyethylene of about 1.5 mils coats the aluminum foil and layer of polyethylene 17 to sandwich the aluminum foil between two layers of polyethylene.

Print 16 is of a color that contrasts with the silver metallic color of the aluminum foil. In addition, part of print 16 is transparent ink to visually set it off with the silver metallic color background of the aluminum foil which provides a light reflective surface adding flash and glitter to the print. The print being sandwiched between base layer 11 and polyethylene layer 17 is protected against abrasion as it is not exposed to the outside surface of the laminated sheet material and takes on the snap and brilliance created by the combination of the transparent and opaque inks with the light reflecting characteristics of the foil surface.

Referring to FIGURE 3, there is shown an apparatus indicated generally at 23 which illustrates a method of fabricating laminated sheet material 10. Base layer 11 is stored in a supply roll 24 and has already been printed with the reverse print 16 according to the design requirements of the package. Layer 11 moves from supply roll 24 under an applicator 26 which applies a primer 27 to the printed surface of layer 11, if a primer is required for the material comprising the base layer. Primer 27 functions as an adhesion promoter. For example, the primer may be a polyethylene imine or a polyurethane type which conditions the surface of base layer 11 to enhance the bond or union with the next layer. Base layer 11 coated with primer 27 moves through a drier 28 and then under an extruder 29 which discharges a hot thin layer or film 17 of liquid thermoplastic material on the entire top surface of layer 11. As the hot thermoplastic liquid is deposited on moving layer 11, the entire top surface is coated with a continuous and substantially uniform film of liquid thermoplastic material. A sheet of aluminum foil 18 moves from a supply roll 31 around the roller 32 onto the top of the hot thermoplastic material 17. The shiny or dull side of the aluminum foil faces the print. As thermoplastic material 17 cools, it sets and adheres to the aluminum foil.

The second applicator 33 is used to apply a shellac wash coat 34 to the opposite or upper side of the aluminum foil. The washed film moves through a second drier 36 and then under a second extruder 37 which applies the inside layer of thermoplastic material 19 on the top surface of the aluminum foil. Layer 19 has uniform thickness and is continuously spread over the entire top surface of the aluminum foil intermediate layer 17 and the base layer. The sheet material is then subjected to pressure and cooling to effect a bond between the thermoplastic layers, thereupon the thermoplastic material is set to form a one-piece sheet. A takeup roll 38 receives the completed laminated sheet material 10.

In using laminated sheet material 10 to fabricate pouches and then packages, the material is cut into transverse strips to form individual package blanks. A single package blank is indicated generally at 39 in FIGURE 4.

Blank 39 is a generally rectangular shape with the aluminum foil covering the printed portion 41 to provide a contrasting color background for print 16 on opposite sides of center line 14 and a transparent window portion 42. Additional print may be applied to reduce the transparent area or size of the window portion depending on the product to be packaged.

In forming the package pouch, blank 39 is folded along center line 14 to provide front and rear flexible walls. Opposite sections of thermoplastic layer 19 are in face-to-face relationship. The pouch is formed by uniting or sealing the peripheral side edges 43 and 44 and header 46 into a weld-type seal with a conventional heat seal device. This is accomplished by heating the peripheral edges and heated to a temperature from between 250 to 350 degrees F. The package is folded so that there is a small flap 47 having a pair of spaced holes 48 extended from the open end of the package. The holes are used to accommodate supports in the packaging operation to hold the pouch at a convenient place for the operator or packager.

As is well known in the art, the pouches can be made in a continuous operation with a Simplex or other similar known pouch manufacturing machines. The sheet material 10 is also suitable to a form and fill operation, such as on a Bartelt machine or a vertical form and fill machine. In the vertical form and fill machines, the pouch would have fin type heat seal longitudinally along one wall of the pouch. This provides the wall with a longitudinal transparent section and at least one opaque section.

Figure 6:
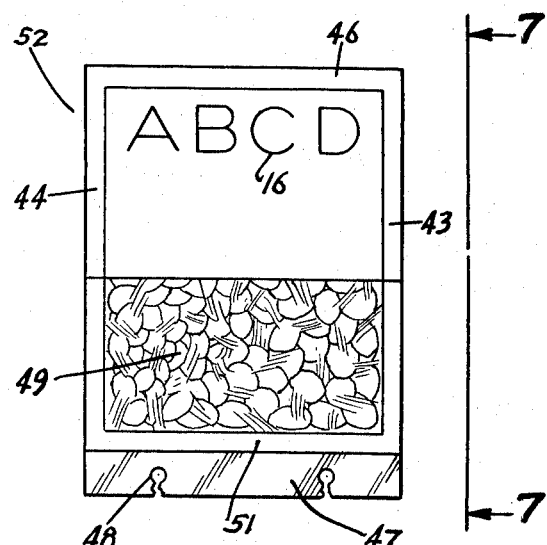
FIGURE 6 is an elevational view of the pouch filled with a product with the mouth of the pouch sealed.
Figure 7:
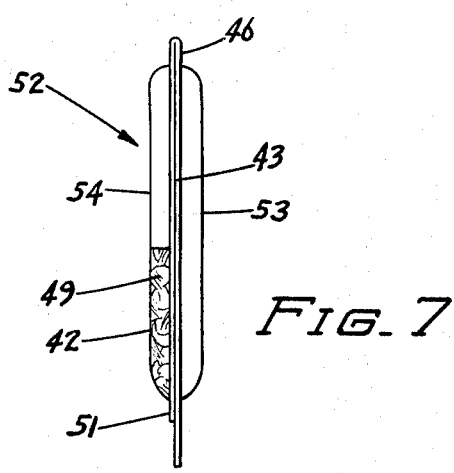
FIGURE 7 is a side view of FIGURE 6 along line 7—7.

As shown in FIGURES 6 and 7, product 49 has been placed in the pouch and the open end has been closed with a seam 51 to form the complete package indicated generally at 52. The package has a flexible back wall 53 which has a layer of aluminum foil and a flexible front wall 54 which partially contains a layer of aluminum foil and has a transparent portion 42 whereby the product 49 is exposed for visual inspection by the customer.

The blank 39, the pouch and the package 52 are shown as an example of an embodiment of the invention. Sheet material 10 may be used to form other sizes of packages, and the flap 47, as well as holes 48, may be eliminated. In addition, the outer surface of the base layer 11 may be printed with additional design and data information as desired. Additional modifications and variations of the sheet material and package described and shown in the drawing may be made without departing from the spirit and the scope of the invention. The invention is limited only by the terms of the appended claims.

The embodiments of the invention in which an exclusive property or privilege is claimed are defined as follows:

1. A laminated sheet material for making heat sealable packages comprising a web of thin transparent flexible material, a repeating pattern of reverse print extended along at least one longitudinal center section of one surface of the web, said web having a transparent section without print, a layer of transparent thermoplastic material coating said printed surface of the web, a sheet of metal foil positioned on said layer of thermoplastic material covering at least a portion of said reverse printed surface, said metal foil being spaced from the transparent section whereby a portion of the sheet material is transparent, said print being of a color which contrasts with the metallic color of the metal foil, and a second layer of transparent thermoplastic material coating the metal foil and said transparent section.

2. The laminated sheet material of claim 1 wherein the web is cellophane and the layers of transparent thermoplastic material are polyethylene.

3. The laminated sheet material of claim 1 wherein the metal foil is narrower in width than the width of the web whereby a portion of the sheet material is transparent.

4. The laminated sheet material of claim 1 wherein the metal foil is aluminum foil.

5. The laminated sheet material of claim 1 wherein the metal foil is aluminum foil having a shiny side covering the reverse print.

6. The laminated sheet material of claim 1 wherein at least a portion of said print is transparent ink.

7. A pouch for receiving a product comprising a flexible front wall and a flexible rear wall, the peripheral side edges and one end of said walls disposed in face-to-face seal contact and the opposite end being open providing access to the space between said walls, at least one of said walls having a first transparent section and a second section having a base web of transparent material, reverse print on the inside surface of the second section of the base web, first layer of transparent thermoplastic material coating the printed surface of the base web, a sheet of metal foil covering at least a portion of the second section carrying the print on the inside surface, and a second layer of transparent thermoplastic material coating the entire inside surfaces of the metal foil and transparent section.

8. The pouch of claim 7 wherein the other wall is substantially identical to the second section of the one wall.

9. The pouch of claim 7 wherein the other wall is substantially identical to said one wall.

10. The pouch of claim 7 wherein the metal foil is aluminum foil having a shiny side facing the reverse print, said reverse print having at least one separate portion of transparent ink.

11. The pouch of claim 7 wherein the front wall and rear wall are formed by folding a single sheet of laminated material.

12. The pouch of claim 7 wherein the opposite end is sealed forming a sealed package.

13. The pouch of claim 7 wherein the metal foil is aluminum foil located between said first layer and said second layer.

14. The pouch of claim 13 wherein the thermoplastic material is polyethylene.

References Cited

UNITED STATES PATENTS

| | | | |
|---|---|---|---|
| 2,050,248 | 8/1936 | Eisen | 161—213 |
| 2,099,641 | 11/1937 | Bach et al. | 161—213 |
| 2,804,416 | 8/1957 | Phillipsen | 161—218 X |
| 3,285,497 | 11/1966 | Stillman et al. | 229—55 |

DAVID M. BOCKENEK, *Primary Examiner.*